(12) United States Patent
Almy

(10) Patent No.: US 7,591,509 B2
(45) Date of Patent: Sep. 22, 2009

(54) SEATING SYSTEMS FOR SHOPPING CARTS

(75) Inventor: James H. Almy, Denver, CO (US)

(73) Assignees: Neil Almy, Littleton, CO (US); Erin Almy, Littleton, CO (US)

( * ) Notice: Subject to any disclaimer, the term of this patent is extended or adjusted under 35 U.S.C. 154(b) by 17 days.

(21) Appl. No.: 11/427,709

(22) Filed: Jun. 29, 2006

(65) Prior Publication Data
US 2008/0036257 A1 Feb. 14, 2008

(51) Int. Cl.
A47D 1/10 (2006.01)
B62J 1/10 (2006.01)

(52) U.S. Cl. ............... 297/256.17; 297/256.16; 297/241; 297/195.11

(58) Field of Classification Search ............ 297/256.17, 297/256.16, 195.11, 195.12, 241
See application file for complete search history.

(56) References Cited

U.S. PATENT DOCUMENTS

| | | | | |
|---|---|---|---|---|
| 1,322,551 | A | * | 11/1919 | Efaw .......................... 297/241 |
| 2,524,187 | A | * | 10/1950 | Boles ......................... 297/241 |
| 3,044,801 | A | | 7/1962 | Vicany |
| 4,096,920 | A | * | 6/1978 | Heyn .......................... 180/11 |
| 4,771,840 | A | * | 9/1988 | Keller ......................... 180/11 |
| 4,830,388 | A | * | 5/1989 | Wang .......................... 280/202 |
| 4,863,217 | A | * | 9/1989 | Fountain ..................... 297/241 |
| 5,011,169 | A | | 4/1991 | Henderson et al. |
| 5,823,548 | A | | 10/1998 | Reiland et al. |
| 5,848,797 | A | | 12/1998 | Paez |
| 5,882,021 | A | | 3/1999 | Reiland et al. |
| 5,947,490 | A | * | 9/1999 | Munnoch et al. ........... 280/32.7 |
| 6,022,031 | A | | 2/2000 | Reiland et al. |
| 6,270,093 | B1 | | 8/2001 | Johnson et al. |
| 6,364,326 | B1 | | 4/2002 | Reiland et al. |
| 6,464,238 | B2 | | 10/2002 | Reiland et al. |
| 6,575,480 | B2 | | 6/2003 | McKelvey |
| 6,651,993 | B1 | * | 11/2003 | Emerzian et al. ......... 280/47.34 |
| 2001/0035619 | A1 | | 11/2001 | Reiland et al. |
| 2002/0020977 | A1 | | 2/2002 | Johnson et al. |
| 2004/0160027 | A1 | | 8/2004 | Conrad |

\* cited by examiner

Primary Examiner—Sarah B McPartlin
(74) Attorney, Agent, or Firm—Townsend and Townsend and Crew, LLP

(57) ABSTRACT

Seating systems for shopping carts, and methods for retrofitting shopping carts with the seating systems, are provided. One seating system may include a seat post with wheel assembly, a cart attachment for connecting to a frame of the shopping cart, and a support member connecting the seat post to the cart attachment. The support member moves toward a basket of the shopping cart into a stored position for collecting the shopping cart with other shopping carts. The support member moves away from the basket of the shopping cart into an operating position.

5 Claims, 11 Drawing Sheets

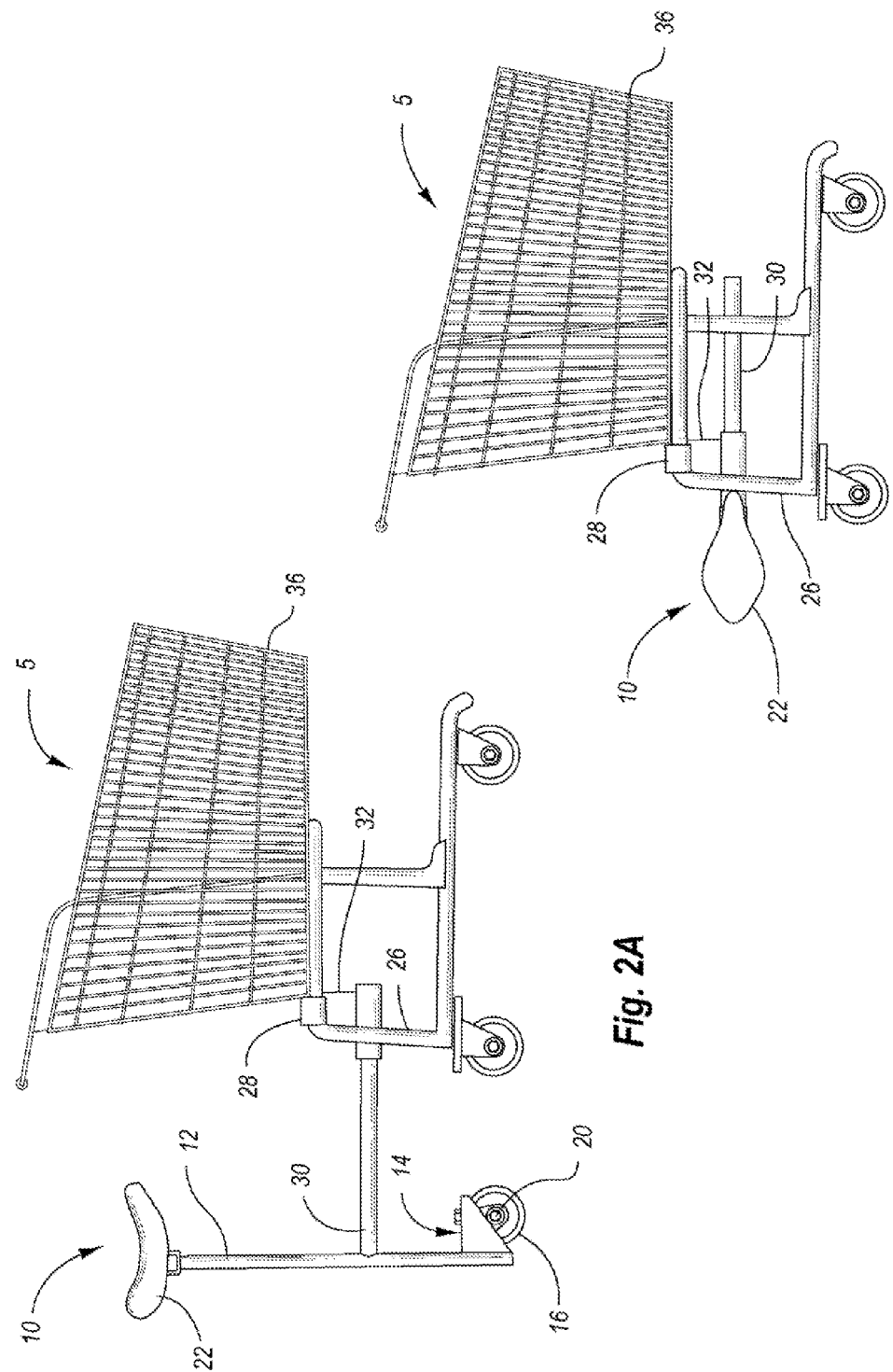

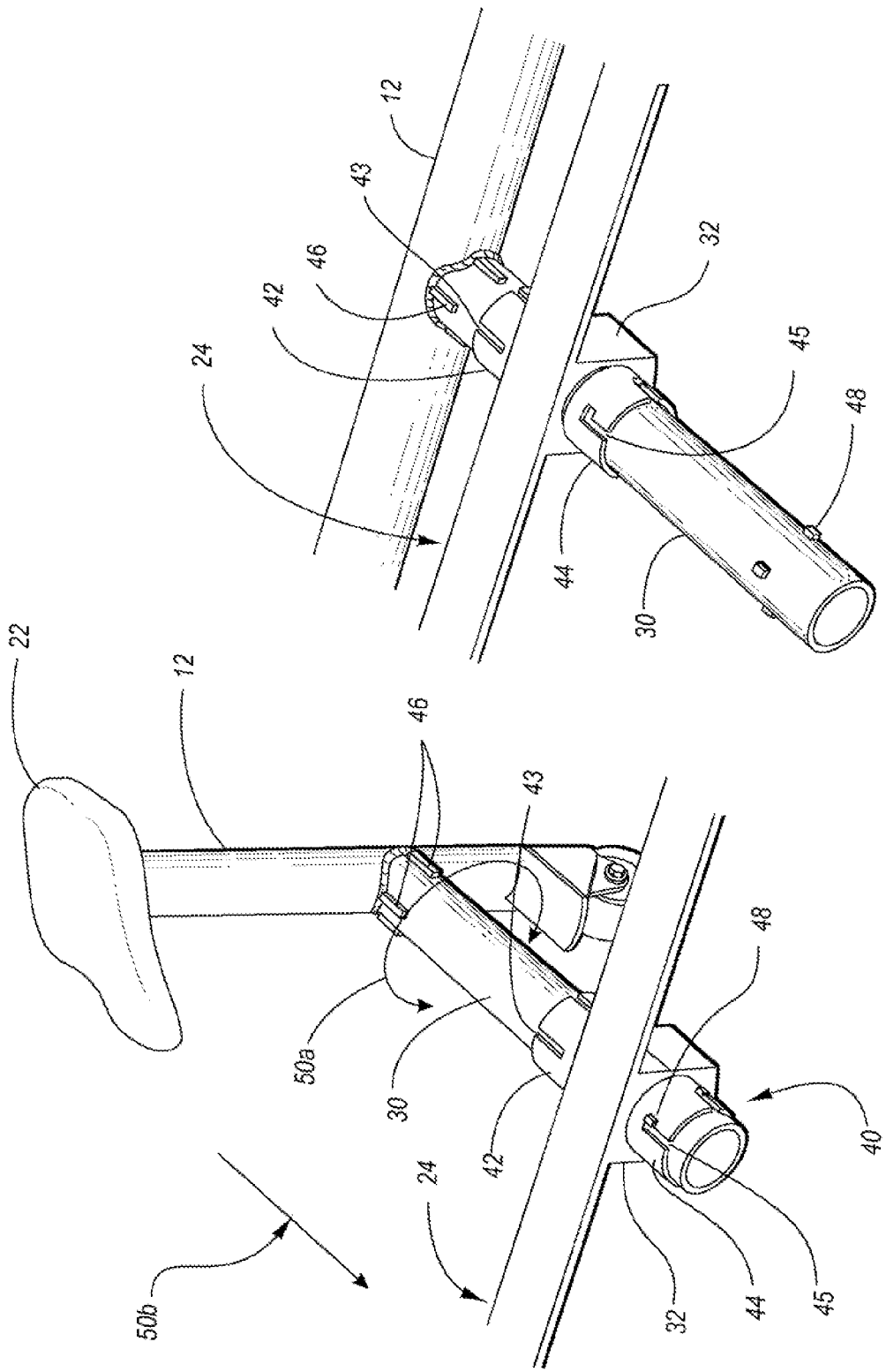

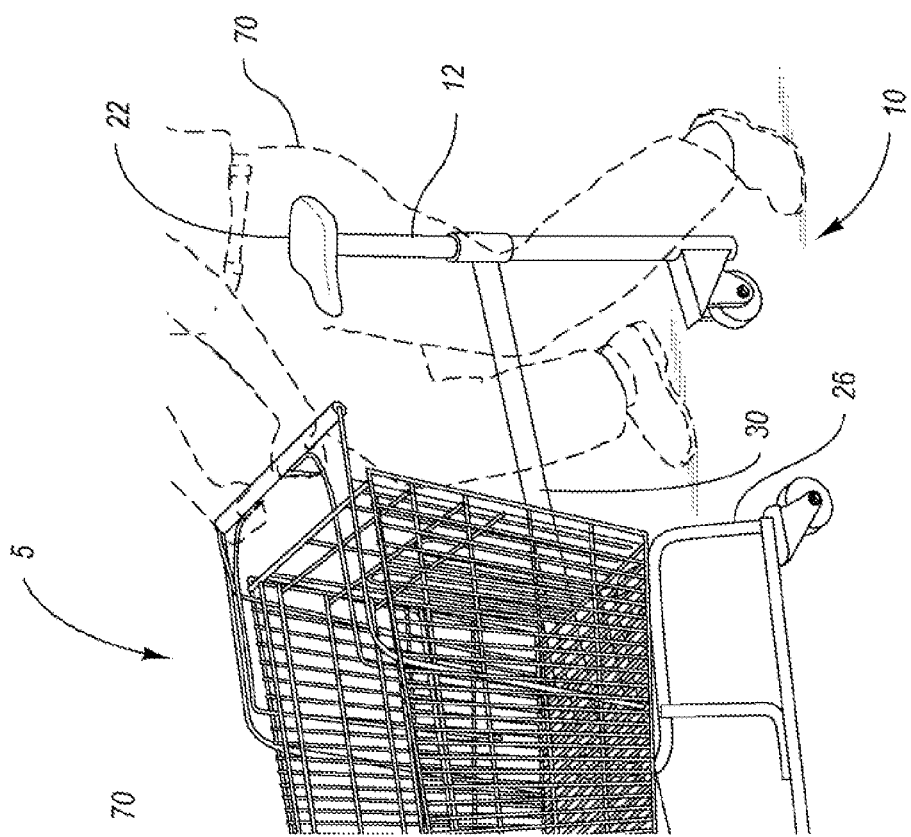
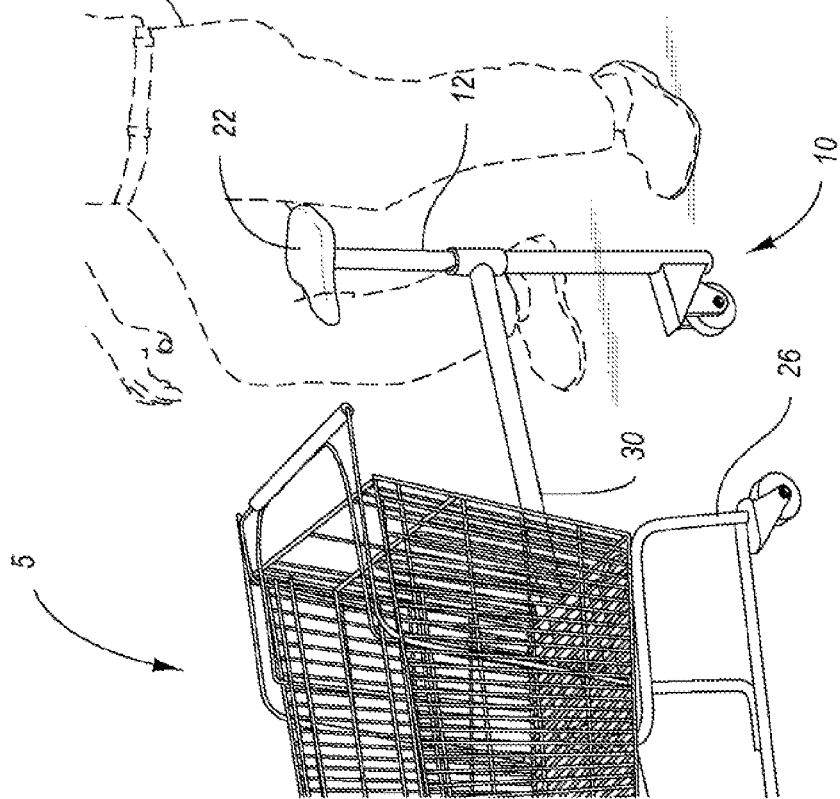
Fig. 5A
Fig. 5B

SEATING SYSTEMS FOR SHOPPING CARTS

TECHNICAL FIELD

The described subject matter relates to shopping carts, and more particularly to seating systems for shopping carts.

BACKGROUND

Shopping carts are commonly provided at grocery stores and other shopping centers for convenience of the shoppers. The primary purpose of shopping carts is to provide a "basket" to hold items for purchase while the shopper is looking for other items or just browsing in the store. Although most shopping carts also include a seating area for small children (a "basket seat"), little if anything is offered for adults.

Large plastic seats have been attached to the back of some shopping carts for older children. An additional two wheels are typically required to support the additional weight of these large plastic seats, making the shopping cart bigger, bulkier, and more awkward to navigate through the store isles. In addition, these seats are not made to support adults.

While many shopping centers now recognize the need to accommodate handicapped shoppers, they do so by providing motorized "scooters" with a small basket that the shopper can use to hold mostly smaller items while they shop. These scooters are generally expensive and therefore, only a few are available at the shopping centers that do provide these for their shoppers. The scooters can also be cumbersome to navigate through the store isles. In addition, many adults who have difficulty standing or walking for long periods of time (or other minor handicaps) prefer not to use these scooters so that more severely handicapped shoppers can use the scooters. Accordingly, these shoppers with minor handicaps may not spend as much time in the shopping center as they otherwise might.

BRIEF DESCRIPTION OF THE DRAWINGS

FIGS. 2a and 2b are side plan views of the exemplary shopping cart with seating system corresponding to FIGS. 1a and 1b, respectively.

FIGS. 3a and 3b are detailed perspective views of a portion of the exemplary seating system shown in FIGS. 1a and 1b, showing (a) the seating system in an operating position, and (b) the seating system in a stored position.

FIGS. 5a and 5b are perspective views of the exemplary shopping cart with seating system shown in FIGS. 1a and 1b, illustrating (a) a user mounting the seating system, and (b) the user seated on the seating system.

DETAILED DESCRIPTION

Figure 1A:
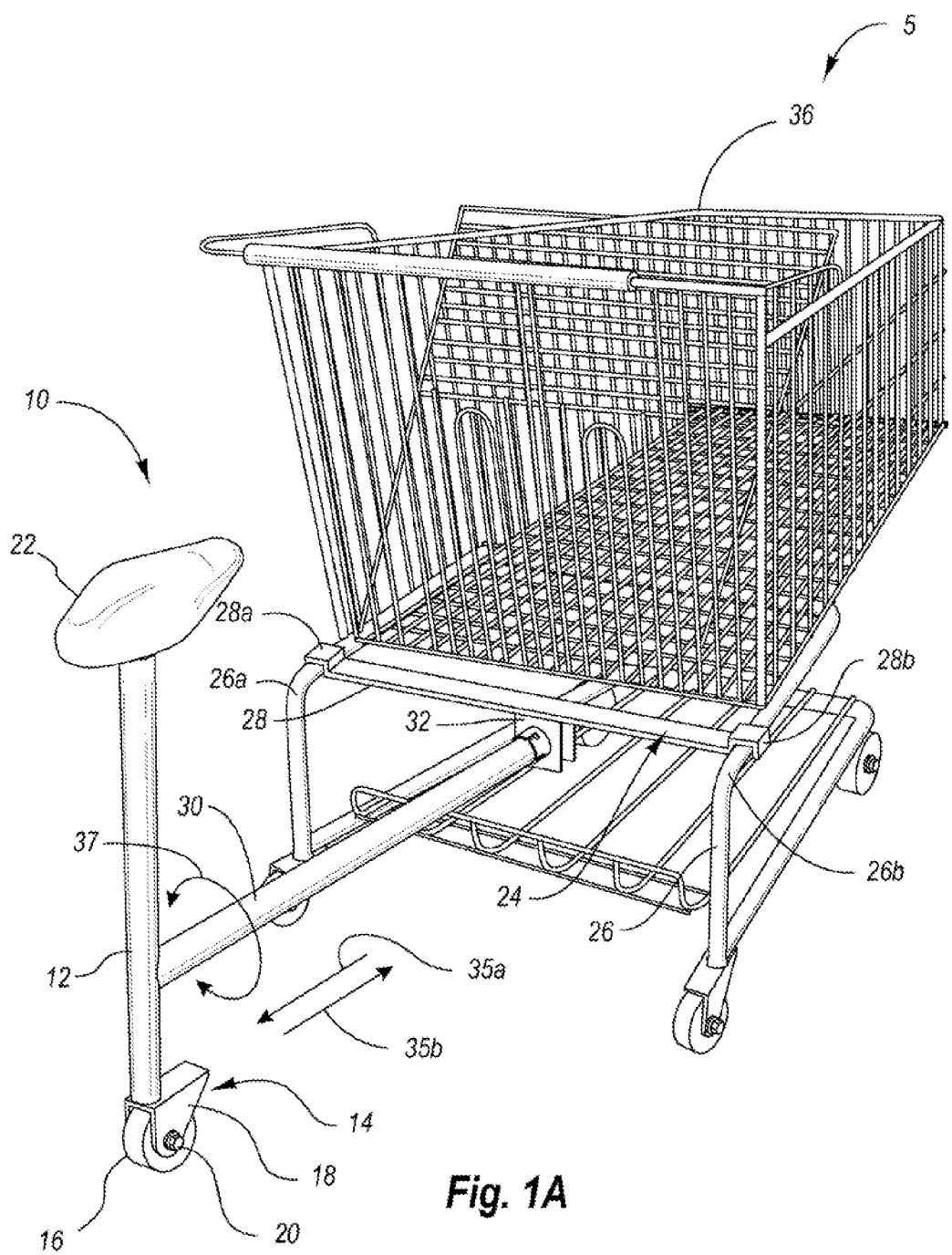
FIGS. 1a and 1b are perspective views of an exemplary shopping cart with seating system showing (a) the seating system in an operating position, and (b) the seating system in a stored position.
Figure 1B:
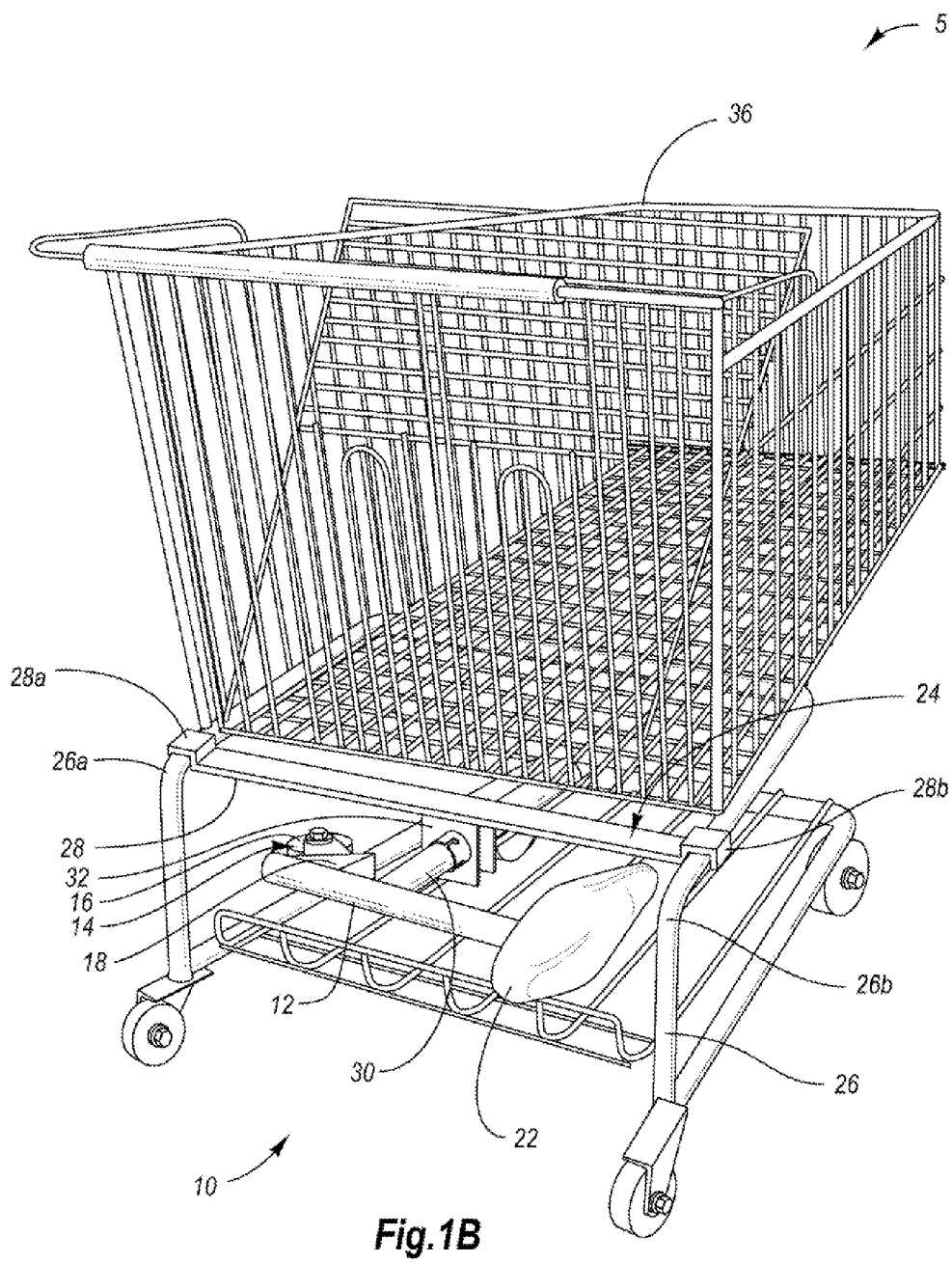

FIGS. 1a and 1b are perspective views of an exemplary shopping cart 5 with seating system 10 showing (a) the seating system 10 in an operating position, and (b) the seating system 10 in a stored position. FIGS. 2a and 2b are side plan views of the exemplary shopping cart 5 with seating system 10 corresponding to FIGS. 1a and 1b, respectively.

Exemplary seating system 10 may include a seat post 12 with wheel assembly 14 in an exemplary embodiment, the wheel assembly 14 includes the wheel 16 mounted to hub 18 through the center axis of the wheel 16, e.g., by bolt 20. A seat 22 may also be mounted to the seat post 12.

A cart attachment 24 may be connected to a frame 26 of the shopping cart 5. For example, the cart, attachment 24 may include a cross-member 28 connected on one side 28a to a left-hand portion 26a of the frame 26, and the cross member 28 connected on the opposite side 28b to a right hand portion 26b of the frame 26. In exemplary embodiments the cart attachment 24 may be connected to the frame 26 of the shopping cart 5 using bolts, rivets, clamps, welds, or other suitable fixed and/or removable fastening methods.

A support member 30 may be provided to connect the seat post 12 with the cart attachment 24. In an exemplary embodiment, the support member 30 may slidably engage the cart attachment 24 by sliding through mounting member 32. Accordingly, the support member 30 may be extended from the cart attachment 24 in the direction illustrated by arrow 35a with the seat post 12 in a substantially vertical position so that the wheel assembly 14 contacts the floor for operation, as shown in FIGS. 1a and 2a.

In addition, the seat post 12 may be rotated, e.g., in the direction illustrated by arrows 37 to a substantially horizontal position, and the support member 30 may be retracted in the direction illustrated by arrow 35b through the cart attachment 24, at least partially under basket 36 of the shopping cart 5. Accordingly, the seating system 10 may be stored, as shown in FIGS. 1b and 2b, in such a manner so as to enable the shopping cart 5 to be collected with other shopping carts as is conventionally done without the seating system 10 interfering with the collection.

It is noted that the seating system 10 may be manufactured of any suitable material. By way of example, the seat post 12 and support member 30 may be manufactured of aluminum tubing (or other metal, high-density plastic, etc.). It is also noted that the seating system 10 is not limited to any particular geometry. For example the seat post 12 and support member 30 may be circular, square or rectangular, triangular, etc.

In exemplary embodiments, the cart attachment 24 may be mounted to any conventional shopping cart 5. Accordingly, the seating system 10 may be readily retrofitted to existing shopping carts without the need to replace an entire fleet of shopping carts to provide customers with shopping carts having the seating system 10. In other exemplary embodiments, however, the seating system 10 may be manufactured as part of a shopping cart 5, e.g., cross-member 28 may be manufactured as part of the frame 26 of the shopping cart 5.

Of course, it is noted that the seating system 10 is not limited to use with any particular type or style of shopping cart. It will be really appreciated by those having ordinary skill in the art after becoming familiar with the teachings herein that the seating system 10 may be used with any of the wide variety of shopping carts, including those which are now commercially available or those which may become commercially available in the future.

Also in exemplary embodiments, the seat 22 may be substantially "diamond" shaped. Such an embodiment enables the user to more easily mount and dismount from the seat 22, e.g., when approaching the seat 22 from behind as illustrated in FIGS. 5a and 5b. The seat 22 may also swivel or rotate about the seat post 12. Such an embodiment enables the seating system 10 to be more readily stored, e.g., without the seat interfering with cart collection. This embodiment may also enhance the user's ability to mount the seat and/or enhance user comfort during operation. However, it is noted that the seating system 10 is not limited to use with any particular type or shaped seat.

FIGS. 3a and 3b are detailed perspective views of a portion of the exemplary seating system 10 shown in FIGS. 1a and 1b, showing (a) the seating system 10 in an operating position, and (b) the seating system 10 in a stored position. These views are provided to illustrate an exemplary locking mechanism 40 provided with the support member 30 and the cart attachment 24, which may be used to maintain the support member 30 in either the extended position for operation (e.g., as illustrated in FIGS. 1a and 2a), or the retracted position for storage (e.g., as illustrated in FIGS. 1b and 2b).

The exemplary locking mechanism 40 may include a first collar 42 on the side of mounting member 32 nearest the seat post 12, and a second collar 44 on the opposite side of mounting member 32. The first collar 42 may have a number of substantially rectangular-shape slots 43 formed therein, and the second collar 44 may have a number of substantially L-shaped slots 45 formed therein. In addition, support member 30 may include at least one pin 46 for mating with or engaging the slots 43 formed in the first collar 42. Support member 30 may also include at least one pin 48 for mating with or engaging the slots 45 formed in the second collar 44.

When the support member 30 is in the extended position (FIG. 3a), the at least one pin 48 engages the L-shaped slots 45 formed in collar 44 and prevent support member 30 from sliding and through mounting member 32 during operation. The seat post 12 may be rotated (e.g., slightly in the direction illustrated by arrow 50a) and pushed in toward the shopping cart 5 (e.g., in the direction illustrated by arrow 50b) to release the pin 48 from the collar 44 so that the seating system 10 may be moved into the retracted position shown in FIG. 3b.

When the seat post 12 is rotated to a substantially horizontal position and support member 30 is moved into the retracted position, the pin 46 engages collar 42 and maintains seat post 12 in the substantially horizontal position. Accordingly, the seating system 10 may be readily stored if a customer does not want to use the seating system 10 or for collecting the shopping cart 5 with other shopping carts, and the seat post 12 does not rotate out of position and interfere with normal operation or collection.

Before continuing, it is noted that the seating system 10 is not limited to use with any particular type of locking mechanism 40 for maintaining the support member 30 in either the extended position for operation, or the retracted position for storage. Still other locking mechanisms, either now known or later developed, are also contemplated and maybe readily implemented by those having ordinary skill in the art after becoming familiar with the teachings herein.

Figure 4:
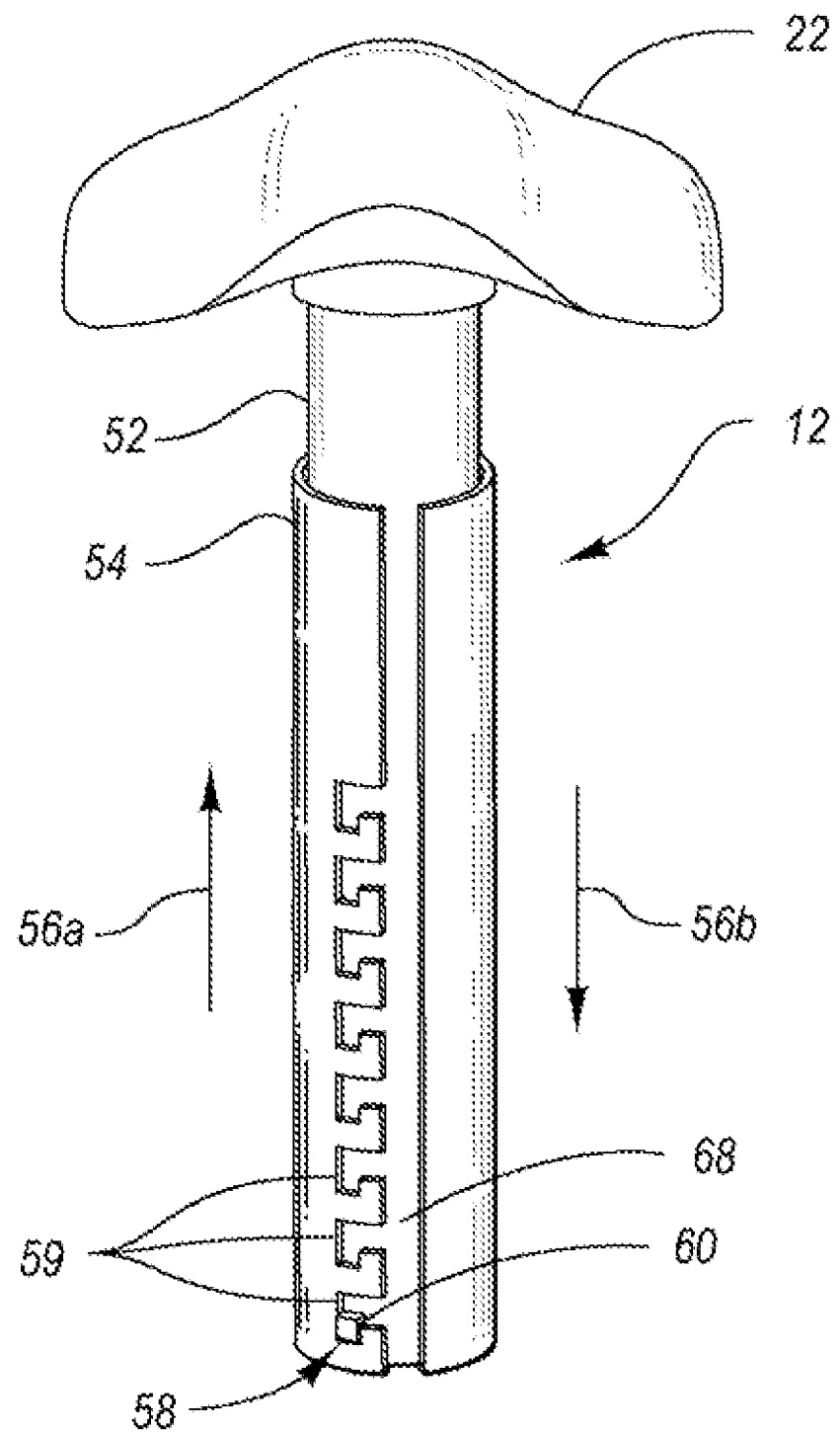
FIG. 4 is a detailed perspective view of an exemplary seat post for the seating system shown in FIGS. 1a and 1b.

FIG. 4 is a detailed perspective view of an exemplary seat, post 12 for the seating system 10 shown in FIGS. 1a and 1b. Exemplary seat post 12 may include at least two concentric post members 52 and 54. Post member 52 may be positioned inside post member 54 so that the two most members 52 and 54 slide relative to one another. Accordingly, seat post 12 may be used to adjust the height of seat 22 by raising and lowering post member 52 inside of post member 54 as illustrated by arrows 56a 56b, respectively.

Seat post 12 may also include a locking mechanism 58. In an exemplary embodiment, the locking mechanism 58 may include a plurality of slots 59 formed on one of the concentric post members (e.g. the outer post member 54), and a pin 60 on another of the concentric post members (e.g., the inner post member 52). The pin 60 may engage one of the plurality of slots 59 to maintain the seat at the desired seat height. But the pin 60 may also be disengaged from the slot 59 to adjust the seat 22 to the desired seat height.

In an exemplary embodiment, such as the embodiment shown in FIG. 4, the slots 59 may be formed in the outer post member 54 as substantially L-shaped slots. Accordingly, when the pin 60 is engaged in one of the plurality of slots 59, the seat 22 remains stationary, e.g., it does not twist or rotate. The seat 22 may be readily adjusted to another seat height, (e.g., for another user) by raising the seat 22 in the direction illustrated by arrow 56a and twisting it so that the pin 60 disengages from one of the slots 59 and can be slid up and down through channel 68. When the seat 22 is that the desired height, the user may rotate the seat 22 so that the pin 60 engages another of the plurality of slots 59 corresponding to the desired seat height.

In an exemplary embodiment, the seat post 12 may be adjusted to a seat height such that the user is in a near standing position when the user is seated on the seat 22, as illustrated in FIGS. 5a-5h and FIGS. 6a-6b. However, the seat 22 may be adjusted to any desired height, and in still another embodiment, the seat post 12 does not need to be adjustable at all.

Before continuing, it is noted that the seating system 10 is not limited to use with any particular type of locking mechanism 58 for adjusting and maintaining the seat height. Still other locking mechanisms, either now known (e.g., quick-release locking mechanisms used on bicycles) or later developed, are also contemplated and maybe readily implemented by those having ordinary skill in the art after becoming familiar with the teachings herein.

FIGS. 5a and 5b are perspective views of the exemplary shopping cart 5 with seating system 10 shown in FIGS. 1a and 1b, illustrating (a) a user 70 mounting the seating system 10, and (b) the user 70 seated on the seating system 10. It is noted that not all of the reference numbers are shown in FIGS. 5a and 5b for purposes of clarity.

When the seating system 10 is in the stored position (e.g. as shown in FIG. 1b), the user may withdraw the seat post 12 from under the basket of the shopping cart 5 and rotate the seat post 12, as described in more detail above with reference to FIGS. 3a and 3b so that it is in the upright (substantially vertical) position shown in FIGS. 5a and 5b. The user 70 may also adjust the seat 22 to the desired seat height as described above with reference to FIG. 4. The following description assumes that the seating system 10 has already been configured for use.

In FIG. 5a, the user 70 is shown approaching the seating system 10 from behind. For example, the user 70 may mount the seating system 10 similarly to how a user would mount a bicycle. It is noted that a substantially diamond shaped seat 22, as described above and better seen in FIG. 1a, readily slides between a user's leg to facilitate the user in mounting the seating system 10. Once seated on the seating system 10, as shown in FIG. 5b, the user 70 may grasp the handle of the shopping cart 5 and push the shopping cart 5 while being supported by the seating system 10.

Figure 6A:
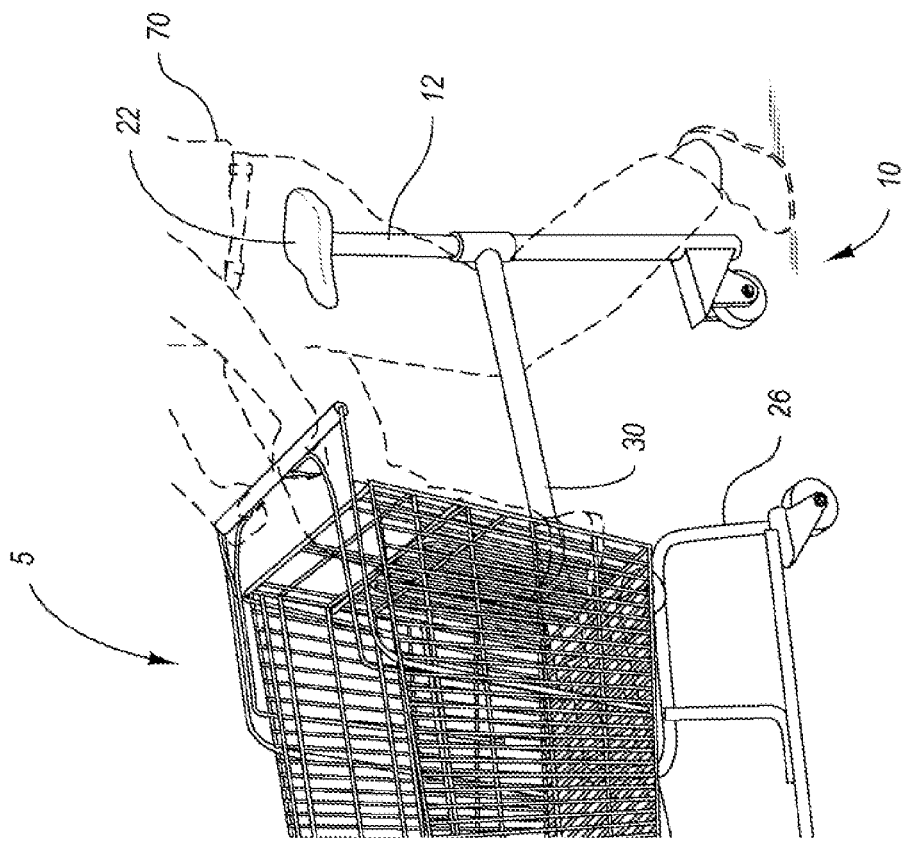
FIGS. 6a and 6b are perspective views of the exemplary shopping cart with seating system shown in FIGS. 1a and 1b, illustrating one method a seated user may move the shopping cart.
Figure 6B:
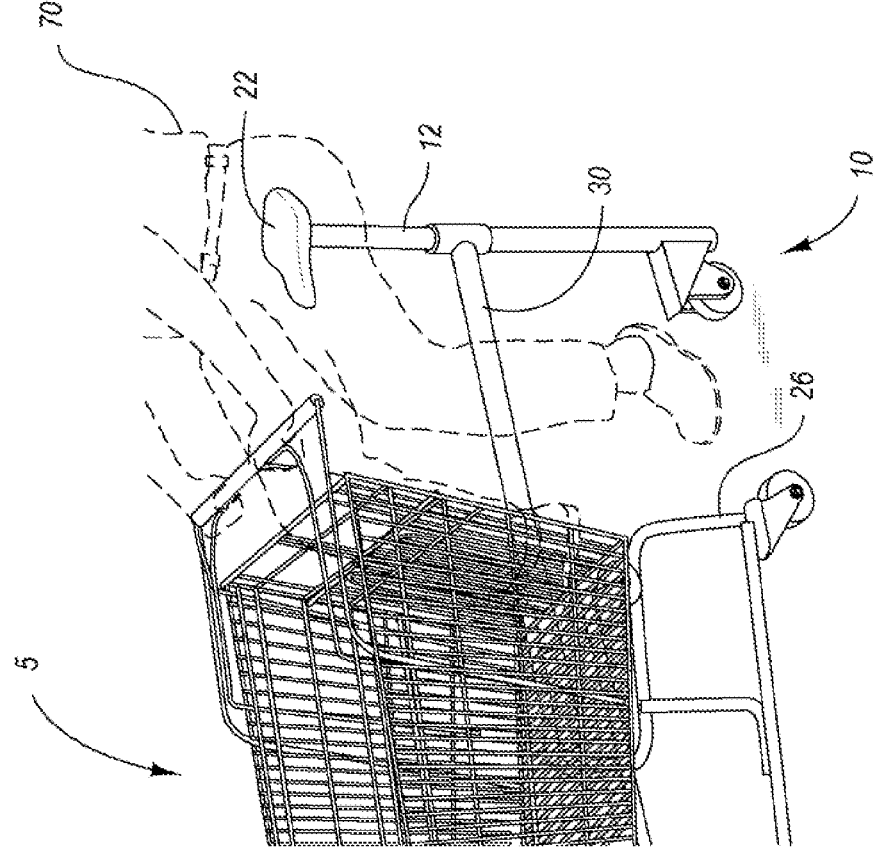

FIGS. 6a and 6b are perspective views of the exemplary shopping cart 5 with seating system 10 shown in FIGS. 1a and 1b, illustrating a seated user 70 moving the shopping cart 5. Optionally, the user 70 may rest one or both feet on the frame 26 of the shopping cart. In FIGS. 6a and 6b, the user is shown resting one foot on the frame 26 of the shopping cart 5 and using the other foot to move the shopping cart, e.g., using a "skateboarding" technique to move the shopping cart 5. That is, the user 70 may swing one foot forward (FIG. 6a) and then push his or her foot backward (FIG. 6b) to move the shopping cart 5. This technique allows the user 70 to easily move the shopping cart with minimal effort while having substantially all of the user's weight supported by the seating system 10. However, it is noted that the seating system 10 is not limited to operation according to any particular technique.

Other Exemplary Embodiments

Figure 7A:
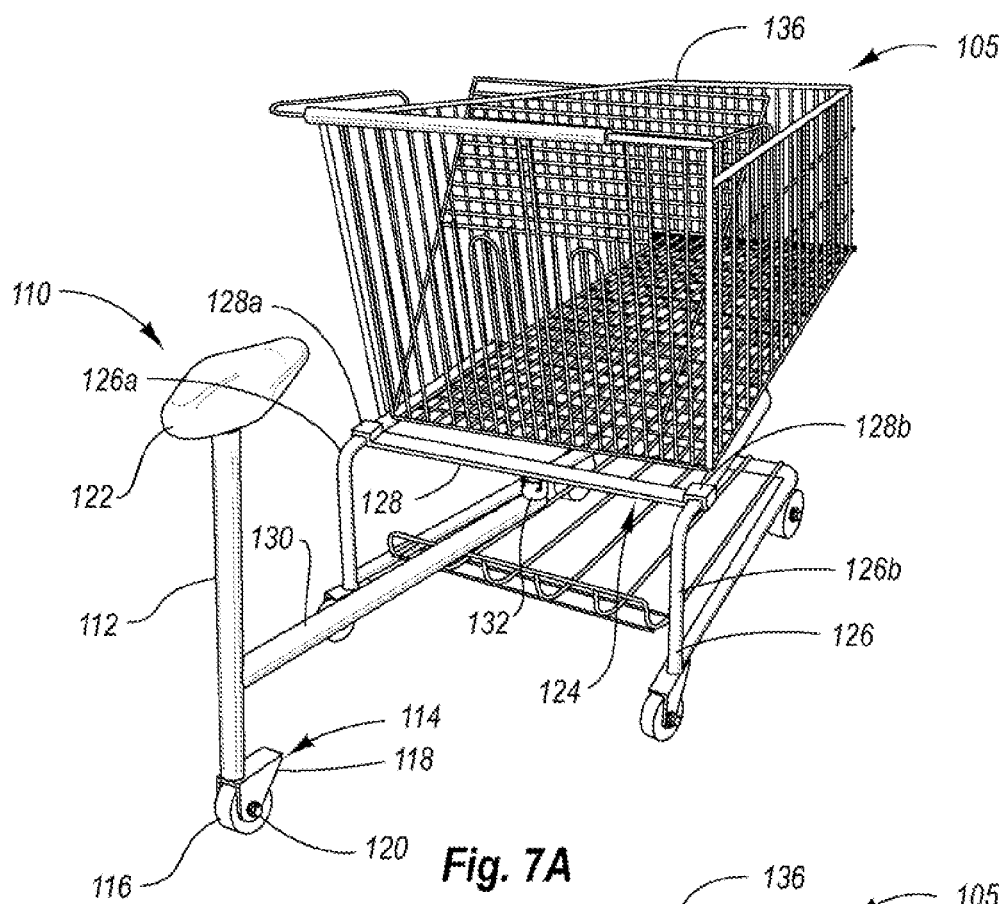
FIGS. 7a and 7b are perspective views of another exemplary shopping cart with seating system showing (a) the seating system in an operating position, and (b) the seating system in a stored position.
Figure 7B:
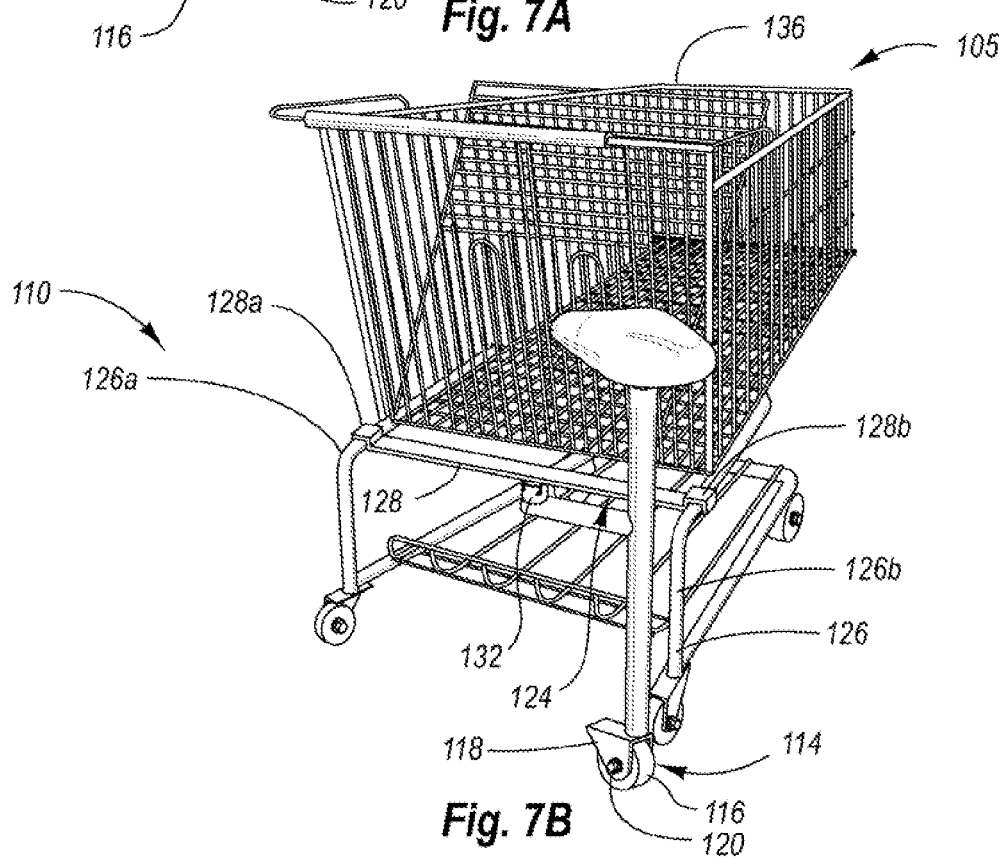
Figure 8A:
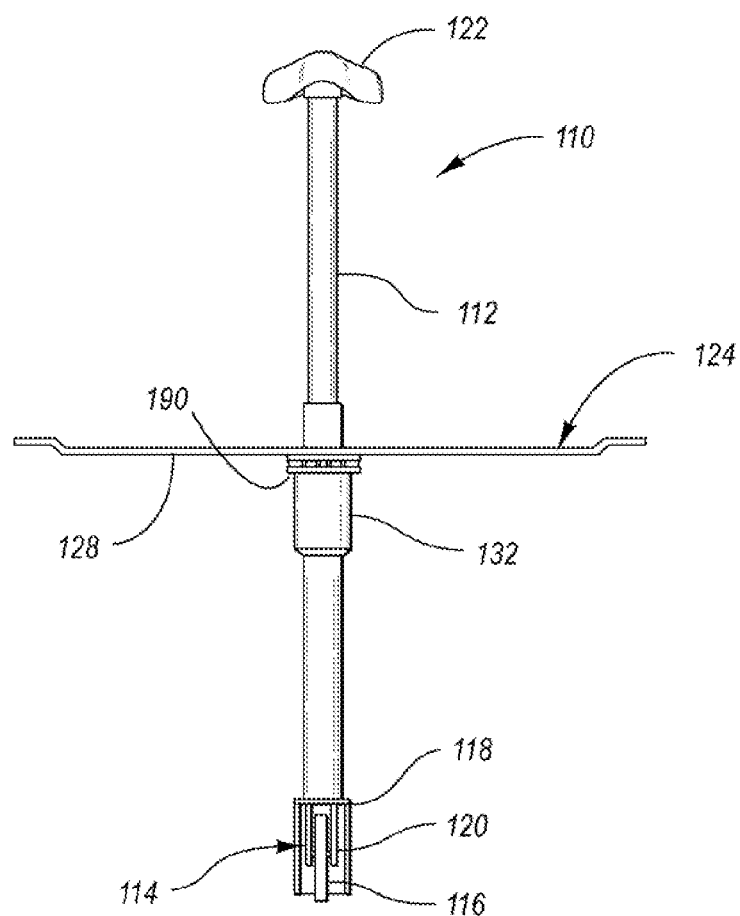
FIGS. 8a and 8b are front and top views, respectively, of a portion of the exemplary seating system shown in FIGS. 7a and 7b.
Figure 8B:
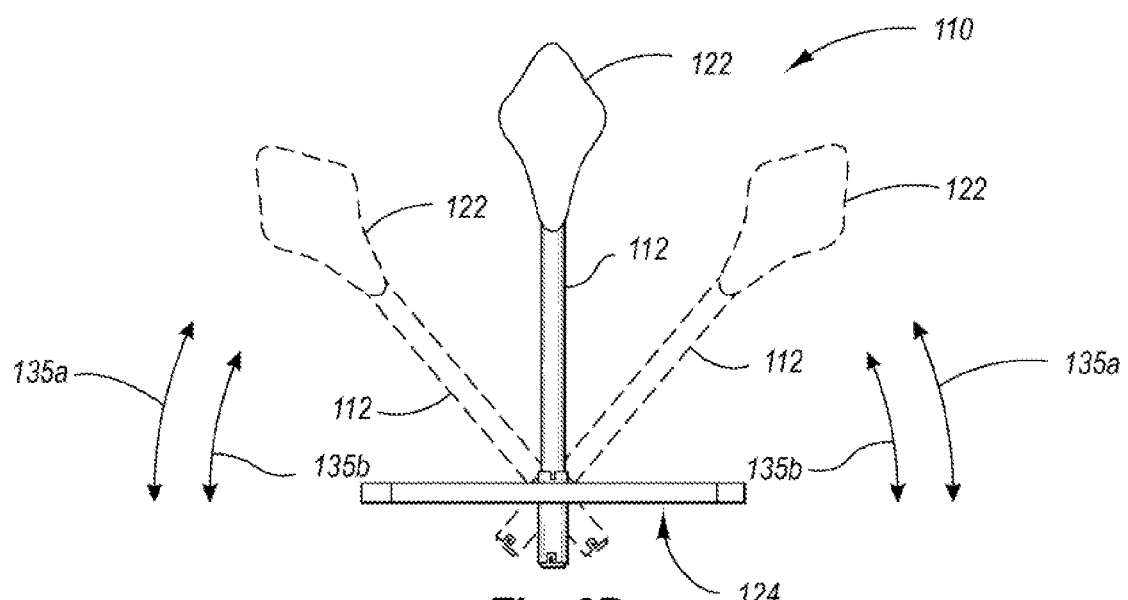

FIGS. 7a and 7b are perspective views of another exemplary shopping cart 105 with seating system 110 showing (a) the seating system 110 in an operating position, and (b) the seating system 110 in a stored position. FIGS. 8a and 8b are front and top views, respectively, of a portion of the exemplary seating system 110 shown in FIGS. 7a and 7b.

It is noted that the seating system 110 includes many like components such have already been described above with reference to the seating system 10. Accordingly, like components are designated using the 100-series reference numbers and may not be described again with reference to the seating system 110.

Figure 9A:
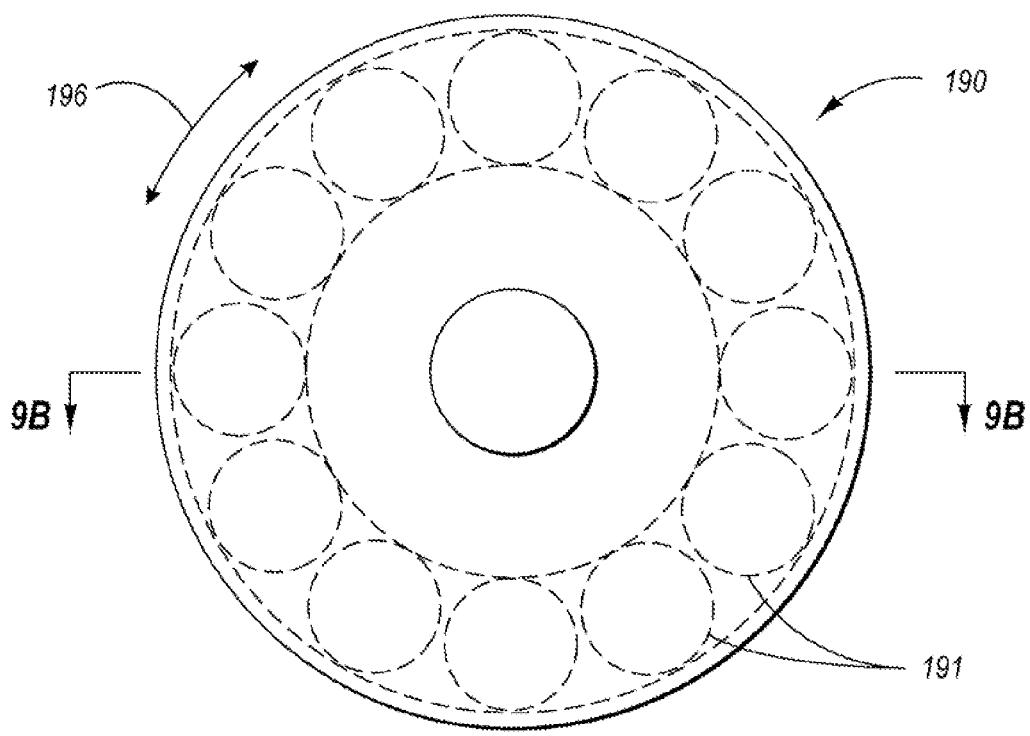
FIGS. 9a and 9b are top and side views of a portion of a bearing assembly for use with the exemplary seating system shown in FIGS. 7a and 7b.
Figure 9B:
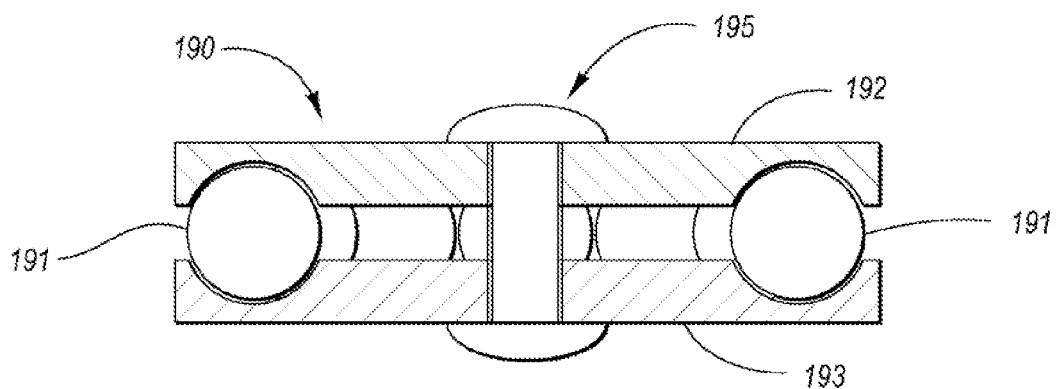

In an exemplary embodiment the support member 130 may pivotally engage the cart attachment 124. For example, the support member 130 may be pivotally mounted to the cart attachment 124 by a bearing assembly 190, as better seen in FIG. 8a. FIGS. 9a and 9b are top and side views of a portion of a bearing assembly 190 for use with the exemplary seating system 110 shown in FIGS. 7a and 7b. The bearing assembly 190 may include a number of rollers 191 "sandwiched" between two plates 192, 193 and held together, e.g., by pin 195, such that the two plates 192, 193 rotate relative to one another as illustrated by arrows 196. One of the plates 193 may be mounted to the support member 130 and another of the plates 192 may be mounted to the cart attachment 124. Accordingly, the support member 130 and cart attachment 124 may be pivoted relative to one another to effect the movement illustrated by FIG. 8b.

It is noted that the bearing member 190 is shown and described herein merely for purposes of illustration. The support member 130 may be pivotally mounted to the cart attachment 124 in any suitable manner and is not limited to the bearing assembly 190. Other mechanisms for pivotally mounting the support member 130 to the cart attachment, now known or later developed, may also be implemented as will be readily appreciated by those having ordinary skill in the art after becoming familiar with the teachings herein.

In any event, the seating system 110 may pivot about mounting member 132 on cart attachment 124, e.g., as illustrated in FIG. 8b. The support member 130 may be pivoted outward from the cart attachment 124 in the direction illustrated by arrow 135a with the seat post 112 in a substantially vertical position so that the wheel assembly 114 contacts the floor for operation, as shown in FIG. 7a.

In addition, the seat post 12 may be pivoted, e.g., in the direction illustrated by arrows 135b to a substantially perpendicular position, near or against the basket 136 of the shopping cart 5. Accordingly, the seating system 110 may be stored, as shown in FIG. 7b, in such a manner so as to enable the shopping cart 105 to be collected with other shopping carts as is conventionally done, without, the seating system 110 interfering with the collection.

Figure 10:
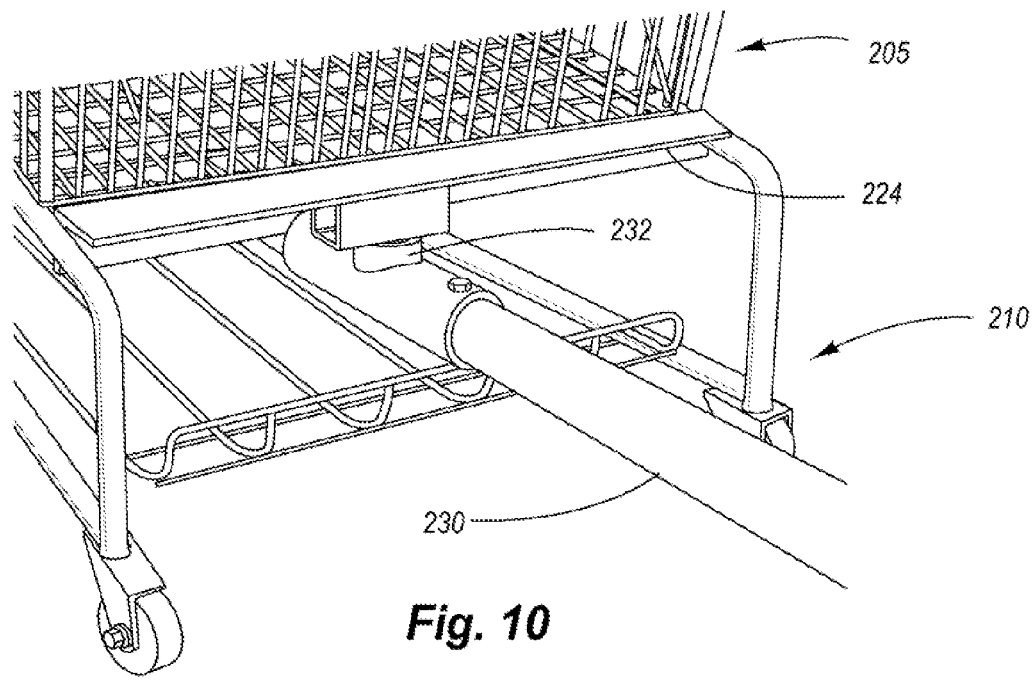
FIG. 10 is a perspective view of a portion of another exemplary seating system.

FIG. 10 is a perspective view of a portion of another exemplary seating system 210. It is noted that the seating system 210 includes many like components such have already been described above with reference to the seating system 10. Accordingly, like components are designated using the 200-series reference numbers and may not be described again with reference to the seating system 210. In an exemplary embodiment, the support member 230 may pivotally engage the cart attachment 224 at mounting member 232 as shown in FIG. 10.

Figure 11:
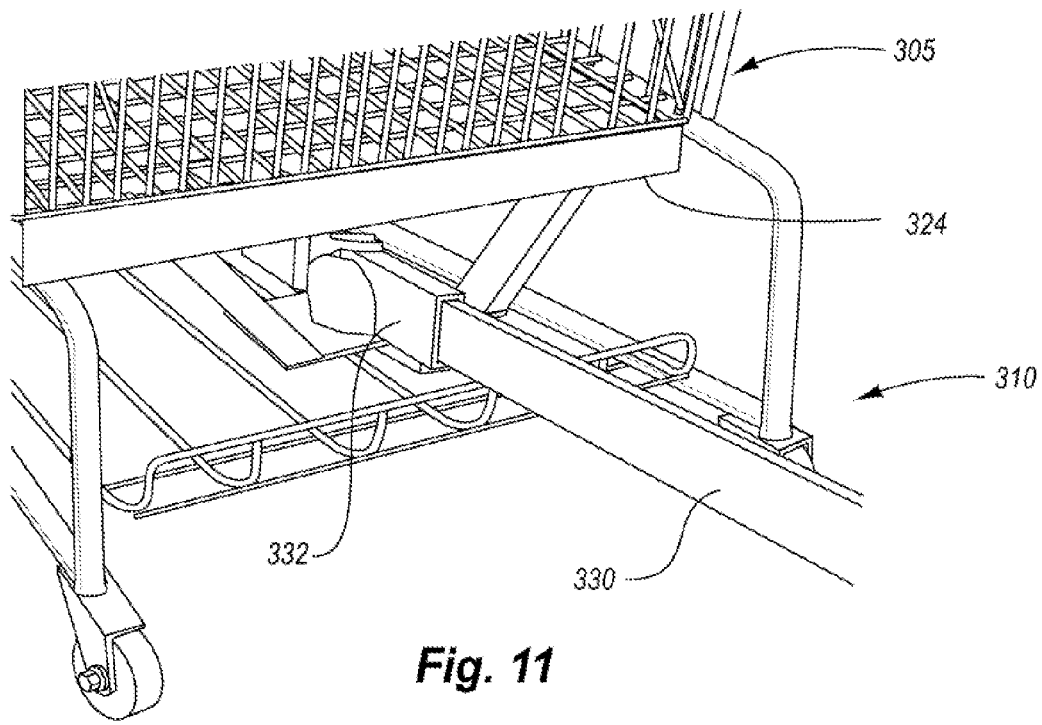
FIG. 11 is a perspective view of a portion of another exemplary seating system.

FIG. 11 is a perspective view of a portion of another exemplary seating system. It is noted that the seating system 310 includes many like components such have already been described above with reference to the seating system 10. Accordingly, like components are designated using the 300-series reference numbers and may not be described again with reference to the seating system 310. In an exemplary embodiment, the support member 330 may slidably engage the cart attachment. 324 at mounting member 332 as shown in FIG. 11.

In addition to the specific embodiments explicitly set forth herein, other aspects and embodiments will be apparent to those skilled in the art from consideration of the specification disclosed herein. It is intended that the specification and illustrated embodiments be considered as examples only.

The invention claimed is:

1. A seating system for a shopping cart, comprising:
   a seat post with wheel assembly;
   a cart attachment for connecting to a frame of the shopping cart; and
   a support member connecting the seat post to the cart attachment, the support member moving toward a basket of the shopping cart into a stored position for collecting the shopping cart with other shopping carts, and the support member moving away from the basket of the shopping cart, into an operating position;
   wherein the support member extends from the cart attachment with the seat post in a substantially vertical position so that the wheel assembly contacts a floor for operation, and the support member retracts through the cart attachment at least partially under the basket of the shopping cart with the seat post in a substantially horizontal position for storage.

2. The seating system of claim 1 further comprising a locking mechanism provided between the support member and the cart attachment, the locking mechanism maintaining the support member in either the extended position for operation or the retracted position for storage.

3. The seating system of claim 2 wherein the locking mechanism includes a collar on the cart attachment and a pin on the support member, the pin engaging a slot formed in the collar to maintain the support member extended from the cart attachment for operation.

4. The seating system of claim 3 wherein the pin disengages the slot formed in the collar to retract the support member through the cart, attachment for storage.

5. The seating system of claim 4 wherein the locking mechanism includes a second collar on the cart attachment and a second pin on the support, member, the second pin engaging a slot formed in the second collar to maintain the seat post in a substantially horizontal position for storage.

* * * * *